United States Patent [19]

Yamamoto et al.

[11] Patent Number: 5,119,355
[45] Date of Patent: Jun. 2, 1992

[54] OPTICAL INFORMATION PROCESSING APPARATUS

[75] Inventors: Osamu Yamamoto, Nara; Toshihiko Yoshida, Tenri; Saburo Yamamoto, Nara, all of Japan

[73] Assignee: Sharp Kabushiki Kaisha, Osaka, Japan

[21] Appl. No.: 505,026

[22] Filed: Apr. 5, 1990

Related U.S. Application Data

[62] Division of Ser. No. 239,753, Sep. 2, 1988, Pat. No. 4,945,525.

[30] Foreign Application Priority Data

Sep. 4, 1987 [JP] Japan .................................. 62-222457
Sep. 4, 1987 [JP] Japan .................................. 62-222458

[51] Int. Cl.$^5$ .............................................. G11B 7/00
[52] U.S. Cl. .................................................. 369/44.12
[58] Field of Search .................... 369/44.11, 44.12, 112; 250/201.5

[56] References Cited

U.S. PATENT DOCUMENTS 4,885,732 12/1989 Sunagawa et al. ............... 369/44.12

FOREIGN PATENT DOCUMENTS

0306342 3/1989 European Pat. Off. ......... 369/44.12
61-59630 3/1986 Japan ................................ 369/44.41
62-112242 5/1987 Japan ................................ 369/44.12
87/05142 8/1987 World Int. Prop. O. ....... 369/44.12

Primary Examiner—Donald McElheny, Jr.

[57] ABSTRACT

An optical information processing apparatus which includes a substrate of a transparent material, first and second optical waveguides formed on opposite faces of said transparent substrate, a light introducing device for introducing reflected light from an information writing medium into the first and second optical waveguides, and a detecting device for detecting a reproduction signal, tracking error signal and focusing error signal based on the reflected light introduced into the first and second optical waveguides.

1 Claim, 9 Drawing Sheets

OPTICAL INFORMATION PROCESSING APPARATUS

This application is a division of co-pending application Ser. No. 07/239,753, filed on Sep. 2, 1988, now U.S. Pat. No. 4,945,525.

BACKGROUND OF THE INVENTION

The present invention generally relates to an information processing arrangement and more particularly, to an optical information processing apparatus employing a semi-conductor laser such as an optical disc device or the like.

Following recent developments in the present information oriented society, optical disc devices capable of recording and reproducing information in a large capacity have been put into actual application. Such optical disc devices include those for compact discs, video discs, additional-writing type optical discs, or rewritable magneto-optical discs. Improvements in optical pick-ups or optical heads designs (which is the most essential portion of an optical disc device) through miniaturization and reduction in weight have been attempted through utilization of techniques in micro-optics owing to the necessity for high speed access and stabilization. However, the size reduction of optical heads is limited since conventional optical heads employ bulk-type optical elements (analyzers, beam splitters, prisms, lenses and other elements).

Therefore, various proposals have been recently made for reducing the size of optical heads. One proposal relates to an optical head for the magneto-optical disc device which utilizes a waveguide type differential detection device. One such device is disclosed in Institute of Electronics, Information and Communication Engineers (IEICE) Magazine, OQE 86-177, written by Sunagawa et al.

Figure 1:
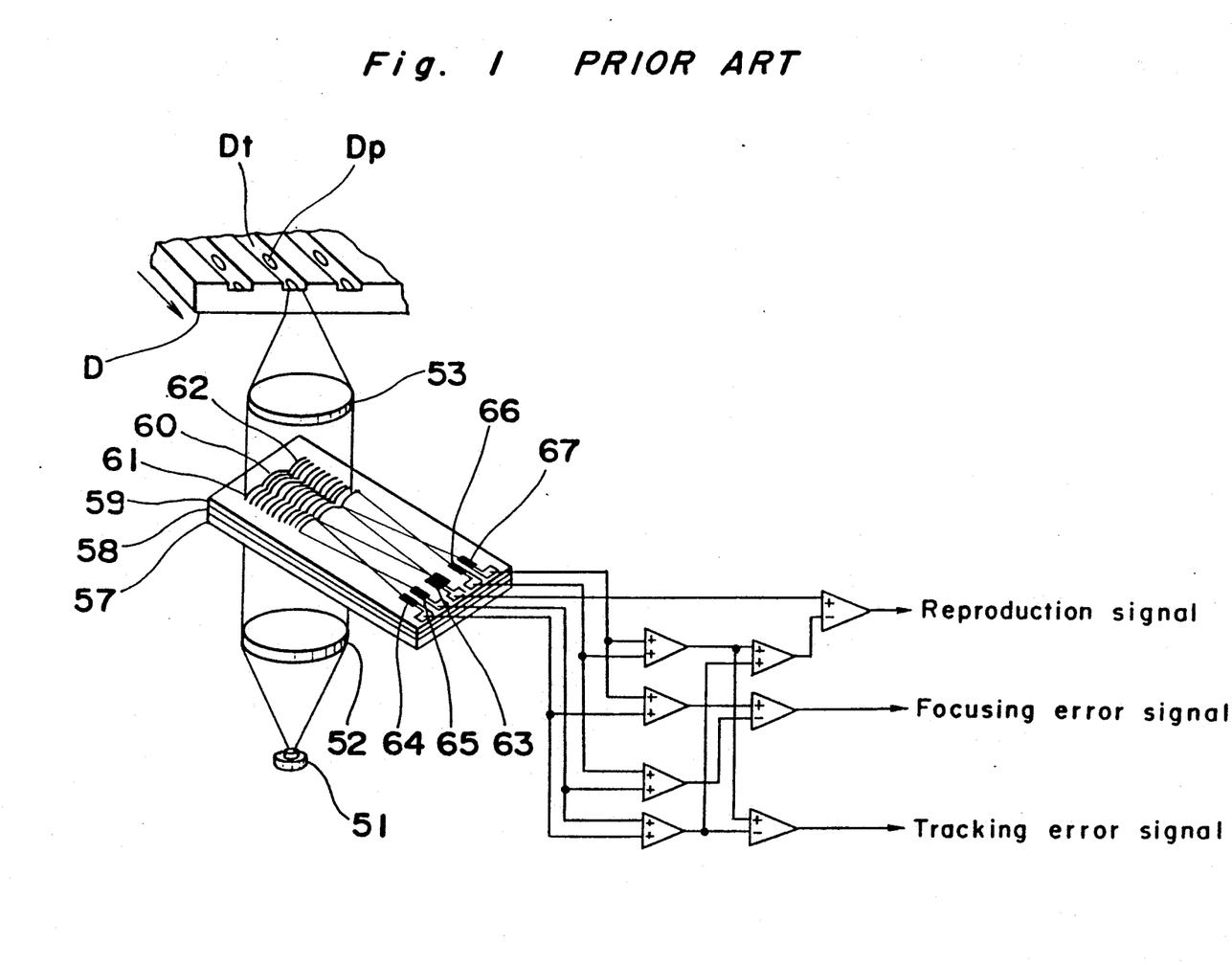
FIGS. 1 and 2 are schematic perspective views showing arrangements in conventional optical information processing apparatuses.

The known optical head as referred to above is schematically shown in FIG. 1.

The waveguide type differential detection device in FIG. 1 includes a PYREX ® glass substrate 57, a planar waveguide layer 58 of #7059 glass formed on the substrate 57 by sputtering, a clad layer 59 of silicon nitride further formed by a plasma CVD process, and trifocal focusing grating couplers 60, 61 and 62 further formed thereon through employment of an electron beam direct drawing method and etching techniques after application of resist on the clad layer 59. The grating cycle is designed so that the focusing grating coupler 60 at the center excites the TM mode, while the focusing grating couplers 61 and 62 at the opposite sides excite the TE mode. Light emitted from a semi-conductor laser source 51 is formed into parallel light by a collimating lens 52, and introduced into said focusing grating couplers 60, 61 and 62. The zero-order diffracted light of the reflected light is transmitted through the above focusing grating couplers 60, 61 and 62, and collected on the magneto-optical disc D by a condenser lens 53. The reflected light subjected to rotation in a polarizing direction by the Kerr effect at the electro-optical disc D is directed in the reverse direction through the condenser lens 53, and formed into waveguide light of TM and TE modes by the focusing grating couplers 60, 61 and 62 so as to be led to the waveguide layer 58, and collected onto photo-detectors 63, 64, 65, 66 and 67 formed on the glass substrate 57. Thus, by calculating the differentiation of outputs of said photo-detectors 63, 64, 65, 66 and 67, the focusing error signal, tracking error signal and reproduction signal are obtained. Since the above waveguide type differential detection device is small and lightweight, with dimensions of about 5 × 12 mm$^2$, a very small optical head may be constructed including the semi-conductor laser 51 and lenses 52 and 53. Therefore, the focusing and tracking functions can be executed by moving the entire optical head with an actuator (not shown) based on the above respective signals.

Incidentally, the optical head employing the conventional waveguide type differential detection device as shown in FIG. 1 adopts a push-pull practice for the detection of the tracking error signal, in which deviation of spot is detected by the intensity of ± primary diffracted light produced by the pit Dp or track Dt on the magneto-optical disc D. Accordingly, a problem exists where the magneto-optical disc D is inclined shifting the optical axis of the diffracted light and DC offset diffracted light producing a DC offset in the tracking error signal, thus resulting in functional instability. Moreover, a similar problem is encountered with respect to the focusing error signal employing the same diffraction light.

Apart from the above, there has also been recently proposed an integrated type optical head as described herein below (See Ura et al., Lecture No. 2P-L-15 of the Society of Applied Physics, Fall, 1985).

Figure 2:
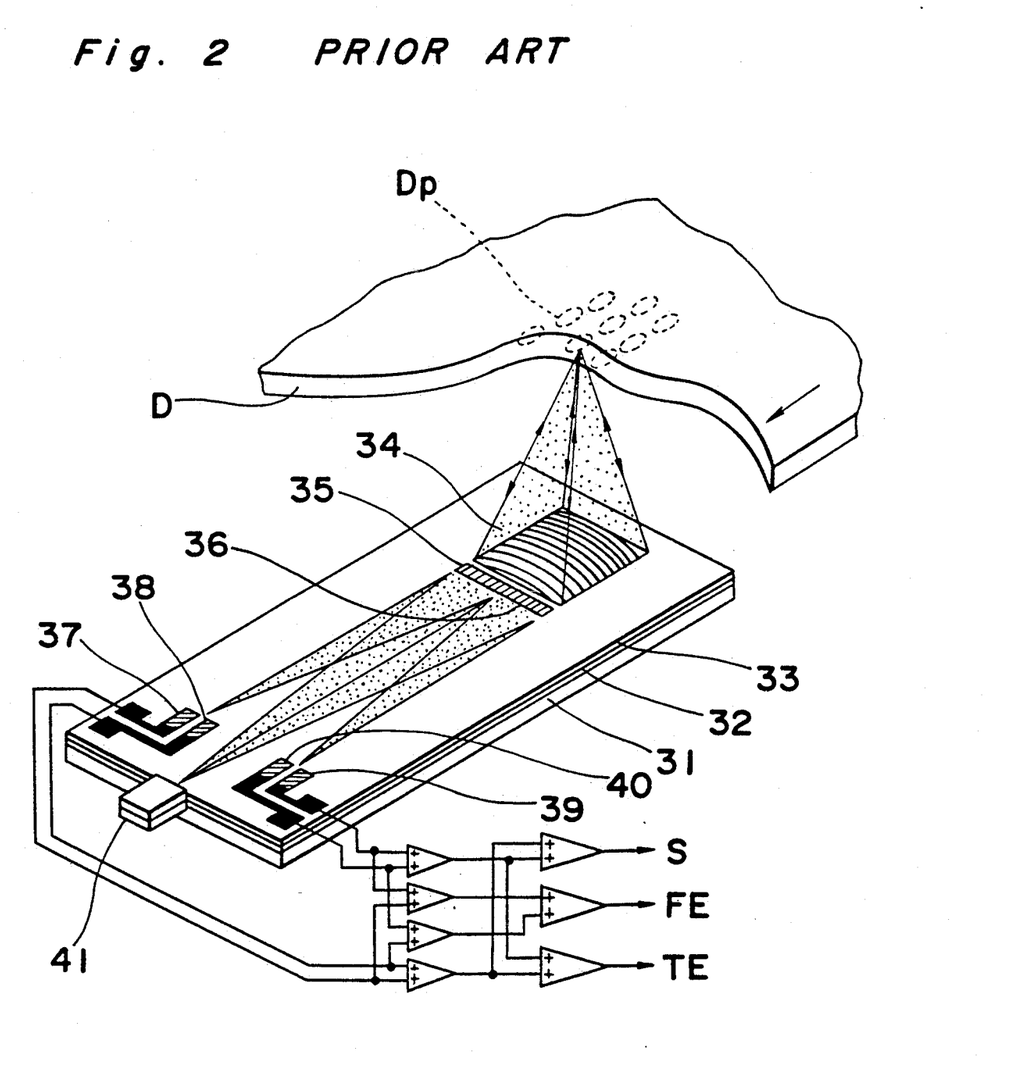

The integrated type optical head as shown in FIG. 2 includes a silicon substrate 31, a buffer layer 32 of SiO$_2$ formed on the surface of the substrate 31 by a head oxidizing process, a flat plate optical waveguide layer 33 of glass formed on the buffer layer 32 by sputtering, a clad layer of silicon nitride further formed by a plasma CVD process, a focusing grating coupler 34 and two sets of focusing grating beam splitters 35 and 36 further formed through adoption of the electron beam drawing method and etching technique after application of resist on the clad layer.

The light emitted from a semi-conductor laser source 41 is introduced from the side face, into the flat plate optical waveguide layer 33 on the silicon substrate 31 and reaches the two sets of focusing grating beam splitters 35 and 36 as it advances while expanding. The light transmitted through said beam splitters 35 and 36 is altered, in its light path, to a space above the silicon substrate 31 by the coupler 34, and is collected onto the pit Dp on the optical disc D. The reflected light from the optical disc D becomes the waveguide light of the flat plate optical waveguide layer 33 by the focusing grating coupler 34 and is diffracted by the beam splitters 35 and 36.

The diffracted light is focused onto photo-detectors 37, 38, 39 and 40 formed on the silicon substrate 31.

The recorded information on disc D is read based on the amount of the reflected light from the pit Dp. In other words, the information may be detected as a sum S of the detection outputs of the photo-detectors 37, 38, 39 and 40. Meanwhile the focusing error signal is detected using the so-called Foucault method. Before the optical disc D reaches the focusing point, the light received by the photo-detectors 37 and 39 at the outer side becomes larger than the light received by the photo-detectors 38 and 40 located at the inner side due to the arrangement of the optical system. Conversely, after the focusing point, the light received by the inner photo-detectors 38 and 40 becomes larger than the light received by the photo-detectors 37 and 39. Based on the above, the sum of the outputs of the photo-detectors 37-39 and the sum of the output of the photo-detector 38-40 are calculated, whereby the focusing error signal FE is detected from the differentiation between the above two sums of the outputs. Meanwhile, the tracking error signal is detected by using the so-called push-pull practice where light received by the photo-detectors 37 and 38, and that of the photo-detectors 39 and 40 is altered by deviation in tracking. Based on this fact, the sum of the outputs of the photo-detectors 39 and 40, and that of the outputs of the photo-detectors 37 and 38 are calculated, and from the differentiation between the above two output sums, the tracking error signal TE is detected.

Since the above silicon substrate 31 is small and light weight with dimensions of $5 \times 12$ mm$^2$, a very compact optical head can be constructed including the semi-conductor laser source 41. Thus, by moving the entire optical head by an actuator (not shown) based on the focusing error signal and tracking error signal, the focusing and tracking functions may be affected. Furthermore, in order to alleviate factors such as aberration and the like, there has also conventionally been proposed a method by which light emitted from the focusing grating coupler 34 is formed into parallel light so as to be focused on the disc through a condensing lens.

However, the conventional integrated type optical head as shown in FIG. 2 adopts the push-pull practice for detecting deviations in the spot based on the strength of ± primary diffraction light produced by the pit Dp on the optical disc D as a method for detecting the tracking error signal. Therefore, the optical axis of the diffracted light is shifted by inclination of the optical disc D to produce DC offset in the tracking error signal, thus resulting in functional instability. Since the focusing error signal employs the same diffraction light as that used for tracking, a similar problem exists. Moreover, due to adoption of the end face coupling method for introducing the light emitted from the semi-conductor laser into the optical waveguide layer 33, the coupling efficiency is low, and there is a disadvantage in that the efficiency of the semi-conductor laser light is lowered with only 10 to 20% of the light rays in the emitted laser light becoming the waveguide light, while remaining light ray is undesirably lost.

SUMMARY OF THE INVENTION

Accordingly, an essential object of the present invention is to provide an improved optical information processing apparatus such as an optical disc apparatus and the like having a compact optical head of high performance, and capable of effecting stable focusing functions and tracking functions at high efficiency, even when an optical disc is inclined.

Another object of the present invention is to provide an optical information processing apparatus of the above described type which is simple in construction and stable in functioning that can be readily manufactured at low cost.

In accomplishing these and other objects, according to one aspect of the present invention, there is provided an optical information processing apparatus which includes a substrate of a transparent material, first and second optical waveguides formed on opposite faces of said transparent substrate, light introducing means for introducing reflected light from an information writing medium into said first and second optical waveguides, and a detecting means for detecting a reproduction signal, tracking error signal and focusing error signal based on the reflected light introduced into said first and second optical waveguides.

Furthermore, the optical information processing apparatus of the present invention may be arranged so that the detecting device includes a three-division photo-detector disposed before a focusing point of the reflected light introduced into said first optical waveguide, and another three-division photo-detector disposed after a focusing point of the reflected light as introduced into said second optical waveguide, whereby in each of said two sets of three-division photo-detectors, differentiation between light receiving output at its central portion and light receiving outputs at its opposite sides is calculated so as to detect the focusing error signal.

By the above arrangement of the present invention, the TE mode of the reflected light from the information writing medium is excited by the first light introducing device so as to be introduced into said first optical waveguide, while the TM mode of said reflected light is excited by the second light introducing device so as to be introduced into said second optical waveguide. Thus, the reproduction signal, tracking error signal and focusing error signal are detected by the detecting device based on the reflected light introduced into said first optical waveguide, and also, similar signals are detected by the detecting device based on the reflected light introduced into said second optical waveguide, with the reproduction signal, tracking error signal and focusing error signal being calculated from the differentiation of the respective outputs of the detecting device.

Additionally, by calculating the differentiation of the light receiving outputs between the central portion and the opposite side portions with respect to each of the above two sets of three-division detectors, the focusing error signal may be detected through comparison of the above two differentiations.

In another aspect of the present invention, the optical information processing apparatus includes a substrate, and optical waveguide formed on said substrate, a light introducing device for introducing light reflected from a recording medium into said optical waveguide to form two collected light rays, three-division photo-detector disposed before a focusing point of the reflected light introduced into said optical waveguide, and another three-division photo-detector disposed after a focusing point of the reflected light introduced into said optical waveguide, whereby in each of said two sets of three-division photo-detectors, differentiation between light receiving output at its central portion and a sum of light receiving outputs at its opposite sides is calculated so as to detect a focusing error signal through comparison of the differentiation in said two sets of three-division photo-detectors.

In a further aspect of the present invention, the optical information processing apparatus includes a substrate, an optical waveguide formed on said substrate, and irradiating device for producing a plurality of laser light spots onto a recording medium so as to introduce the reflected light into said optical waveguide, and a set of photo-detectors for subjecting to photo-electric conversion, the reflected light introduced into said optical waveguide for each reflected light corresponding to each spot of the plurality of said laser light spots, so as to correspond to the light intensity thereof, whereby detection of the tracking error signal being effected through comparison of the light receiving outputs of the photo-detectors.

In another aspect of the present invention referred to above, the light reflected from a recording medium is introduced into the optical waveguide by the light introducing device to form two collected light rays. In both the three-division photo-detector disposed before the focusing point of the reflected light introduced into said optical waveguide, and the three-division photo-detector disposed after the focusing point of the reflected light introduced into said optical waveguide, the differentiation between the light receiving output at its central portion and a sum of light receiving outputs at its opposite sides is calculated, and thus the focusing error signal is detected by comparing the two differentiations.

In a further aspect of the present invention, the plurality of laser light spots are projected onto the recording medium for introducing the reflected light into said optical waveguide, and the reflected light introduced into said optical waveguide is subjected to the photoelectric conversion by the photo-detectors for each reflected light corresponding to each spot of the plurality of said laser light spots, so as to correspond to the light intensity thereof, and thus, the tracking error signal is detected by comparing the light receiving outputs of the photo-detectors.

BRIEF DESCRIPTION OF THE DRAWINGS

These and other objects and features of the present invention will become apparent from the following description taken in conjunction with the preferred embodiment thereof and with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 3:
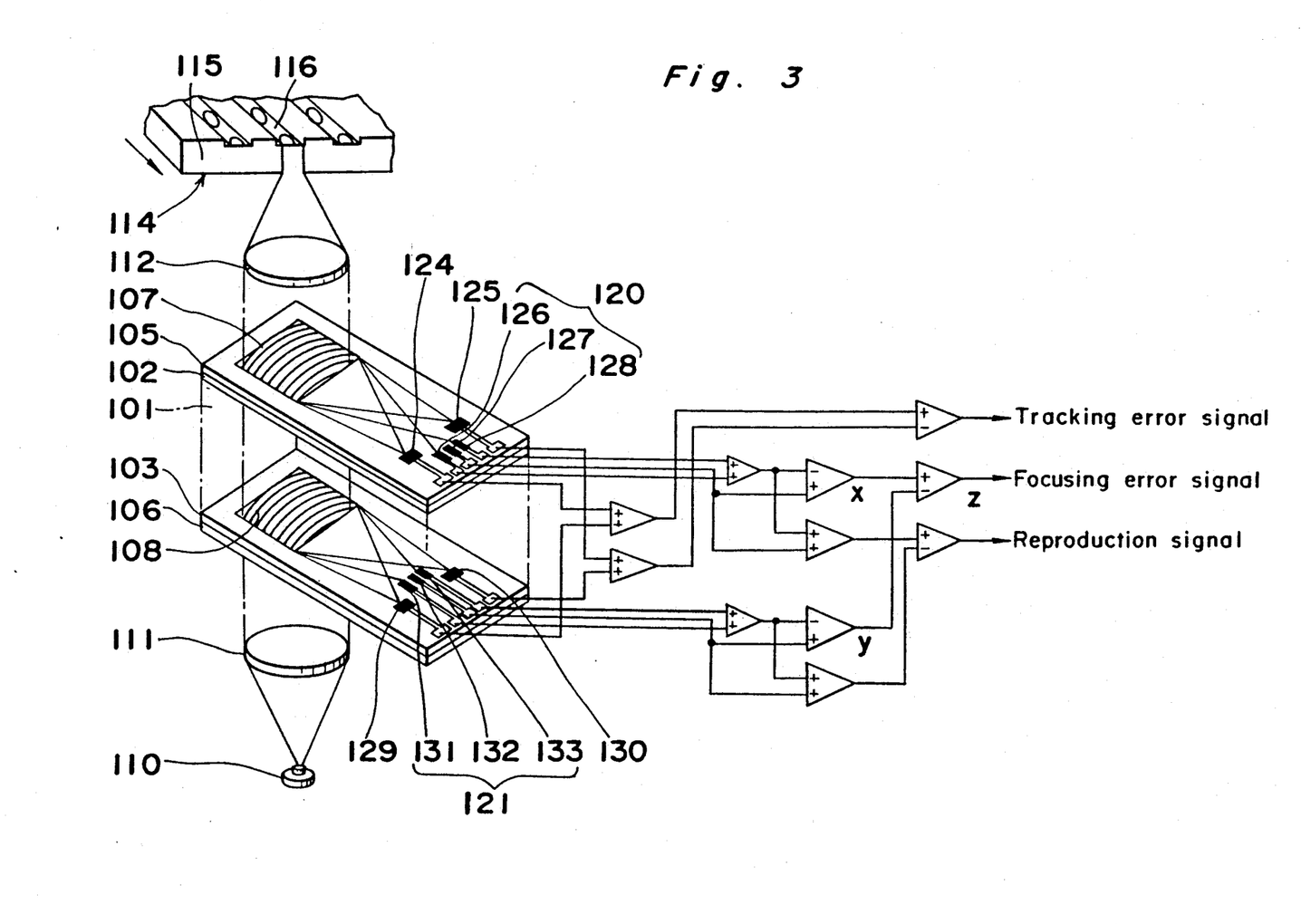
FIG. 3 is a schematic perspective view showing general construction of an optical information processing apparatus according to one preferred embodiment of the present invention.

Referring now to the drawings, there is shown in FIG. 3, an optical information processing apparatus according to one preferred embodiment of the present invention, which includes a transparent substrate 101 of a glass material, e.g., PYREX ® glass having a thickness of 1 mm, optical waveguide layers 102 and 103 of #7059 glass each 0.76 μm in thickness and respectively formed on upper and lower faces of the glass substrate 101 by a sputtering process, and silicon nitride clad layers 105 and 106 each 0.04 μm in thickness and further formed on the optical waveguide layers 102 and 103 by plasma CVD process. After formation of the above clad layers 105 and 106, a focusing grating coupler 107 for exciting the TE mode is formed on the glass substrate 101, while another focusing grating coupler 108 for exciting the TM mode is formed on the lower surface of said glass substrate 101 respectively. Positioning on the upper and lower faces of the substrate 101 may be effected at high accuracy through employment of a duplex mask aligner (not shown).

The focusing grating couplers 107 and 108 referred to above are manufactured by using a photomask in which a grating pattern prepared by an electron beam drawing process is transferred and also, so arranged that through utilization of the fact that effective refractive indexes of the optical waveguides are different between the TE mode and TM mode, the respective modes are selectively guided by slightly varying the grating cycles to each other.

Figure 4A:
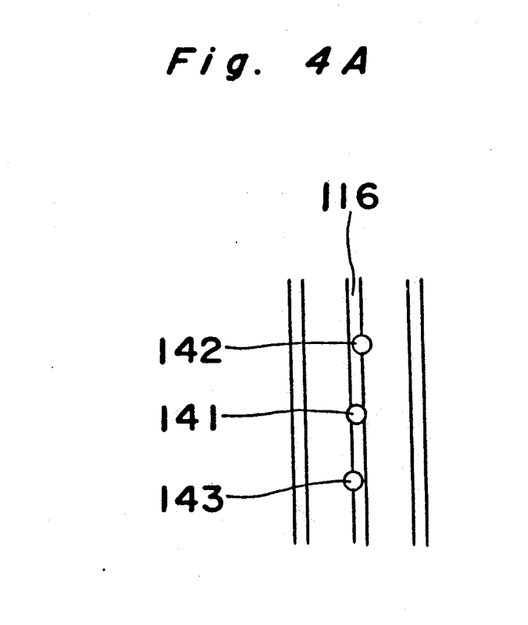
FIGS. 4A, 4B and 4C are diagrams for explaining light spots on a magneto-optical disc as used for the apparatus of FIG. 3, FIGS. 5A and 5B are diagrams showing the state of incidence of reflected light upon three-division photo-detectors in the arrangement of FIG. 3.

Light in three beams with a spot interval of 100 μm emitted from a semi-conductor laser 110 disposed below the substrate 101 is formed into parallel light by a collimating lens 111 provided above said semi-conductor laser so as to be incident upon the focusing grating coupler 108. Subsequently, the zero-order diffraction light transmitted through the focusing grating coupler 108 further passes through the focusing grating coupler 107, and thereafter, is collected onto the magneto-optical disc 114 by a condenser lens 112 in a state as illustrated in FIG. 4A, in which a main spot is denoted by Numeral 141, sub-spots are represented by Numerals 142 and 143, and a recording track is indicated by Numeral 116.

Figure 5A:
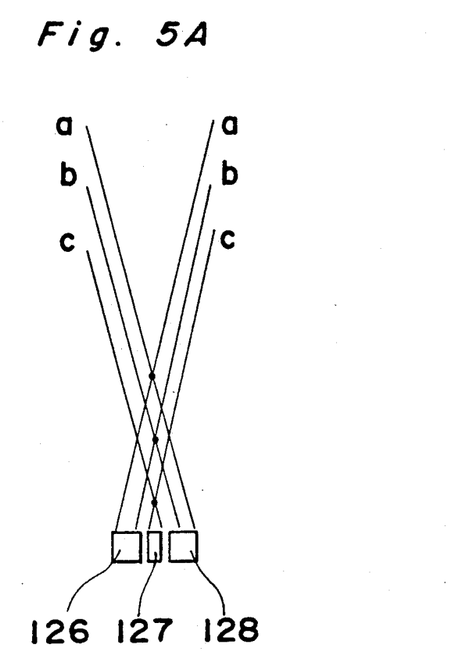
Figure 5B:
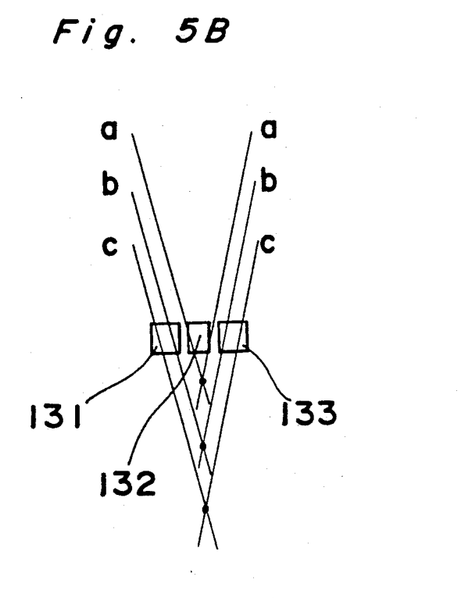
Figure 6:
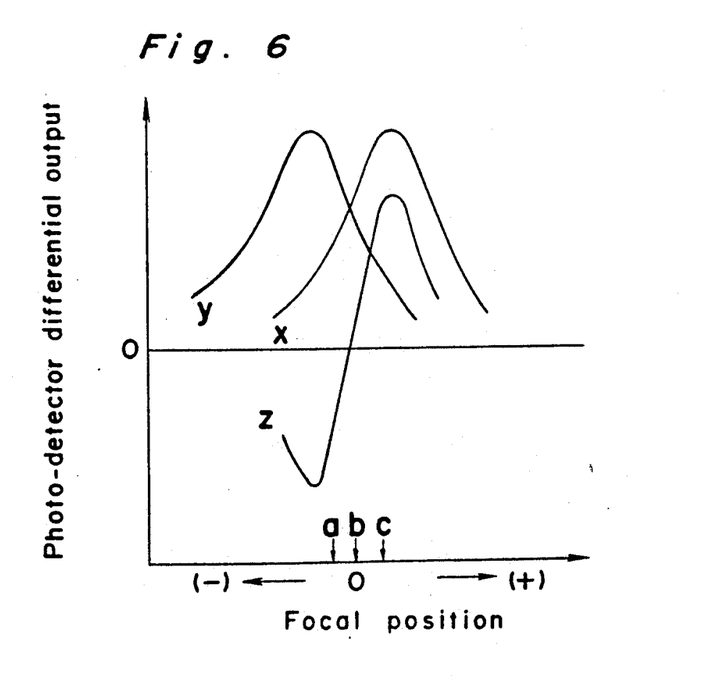
FIG. 6 is a graphical diagram for explaining differential output of the photo-detectors in the arrangement of FIG. 3.

The reflected light of the main spot 141 subjected to rotation in the polarizing direction by Kerr effect at the magneto-optical disc 114, passes through the condenser lens 112 in the reverse direction, and by the focusing grating couplers 107 and 108, the TE mode becomes the waveguide light of the waveguide layer 102, while the TM mode becomes that of the waveguide layer 103. Thus, light intensity thereof is detected by two sets of three-division photo-detectors 120 and 121 of amorphous silicon formed on the opposite faces of the glass substrate 101. The three-division photo-detector 120 referred to above is disposed in a position after a focal point of the focusing grating coupler 107, while the photo-detector 121 is provided in a position before a focal point of the focusing grating coupler 108 as shown. Reflected light is incident upon the three-division photo-detectors 120 and 121 in the state as illustrated in FIGS. 5A and 5B respectively, in which lines b denote the case where the focal point of the light spot is located on the optical disc 114, lines a show the case where the focal point of the light spot is present before the optical disc 114, and lines c represent the case where the focal point of the light spot is in the inner side of the optical disc 114. The differential outputs at the central portions 127 and 132, and at the opposite sides 126 and 128, and 131 and 133 of the above three-division photo-detectors 120 and 121, are respectively obtained as x and y shown in FIG. 3, and are formed in curves as plotted in FIG. 6 with respect to the focal point of the light spot. Since the focusing error signal z which is the differential outputs of x and y, is in the form of an S-shaped curve, it becomes possible to detect the position of the focal point.

Figure 4B:
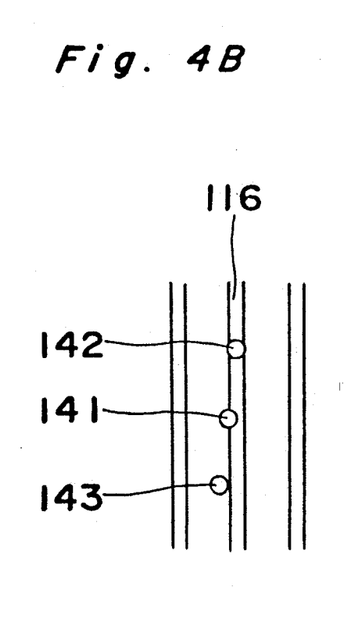
Figure 4C:
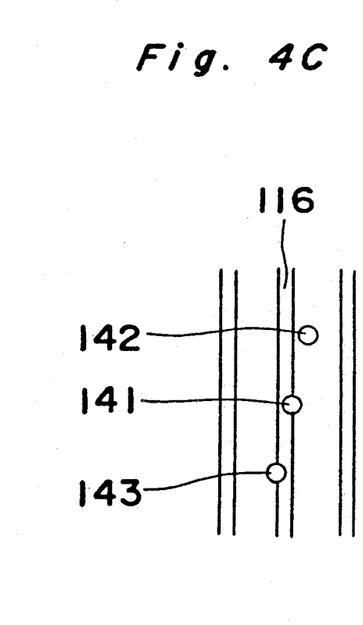

Meanwhile, reflected light from the two sub-spots 142 and 143 is incident upon the photo-detectors 124 and 125 for the TE mode, and also upon the photo-detectors 129 and 130 for the TM mode respectively by the focusing grating couplers 107 and 108. The recording track 116 formed on the magneto-optical disc 114 is different in thickness from the substrate 115 by $\frac{1}{8}$ wavelength. Therefore, in the case where the main spot 141 is located at the center of the recording track 116 as shown in FIG. 4A, the reflected light rays of the sub-spots 142 and 143 are of the same intensity, but when the main spot 141 deviates from the center of the recording track 116 as in FIG. 4B, the sub-spots 142 and 143 are made asymmetrical with respect to the center of the recording track 116, thus producing a different intensity for the reflecting light. Accordingly, the tracking error signal may be detected by taking the differentiation between the photo-detectors 124 and 129, and the photo-detectors 125 and 130. It is to be noted here that the recording track 116 may be either in the form of a line or pit.

As described so far, in the above arrangement of the present invention, the TE mode and TM mode of the reflected light from the magneto-optical disc 114 are respectively excited by the focusing grating couplers 107 and 108 so as to be introduced into the optical waveguides 102 and 103, and the TE mode and TM mode are respectively detected by the three-division photo-detector 120 with the photo-detectors 124 and 125, and by the three-division photo-detector 121 with the photo-detectors 129 and 130 for calculating the differentiation thereof. Therefore, there is no possibility that any offset occurs with respect to the inclination of the magneto-optical disc 114. Accordingly, stable focusing and tracking functions may be effected for writing, recording and reproduction of the magneto-optical disc device with high accuracy.

Figure 7A:
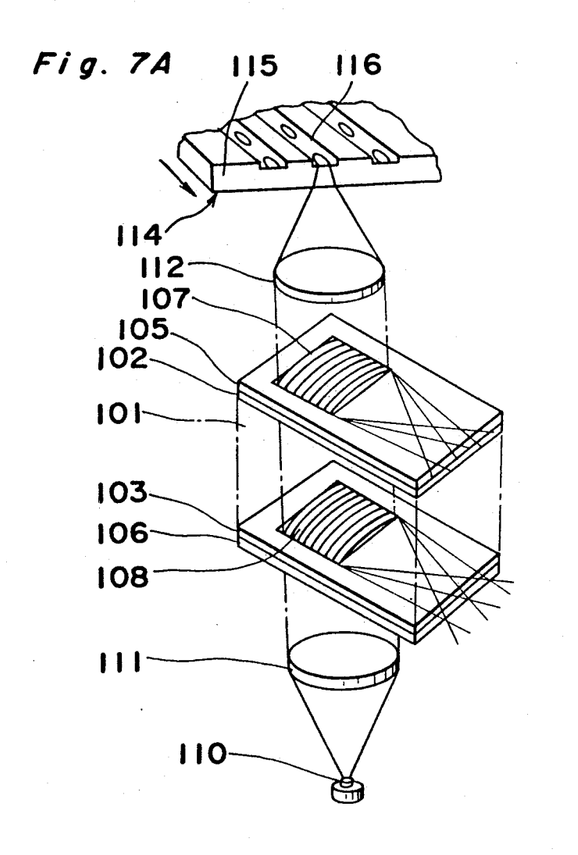
FIG. 7A is a modified embodiment of that shown in FIG. 3.
Figure 7B:
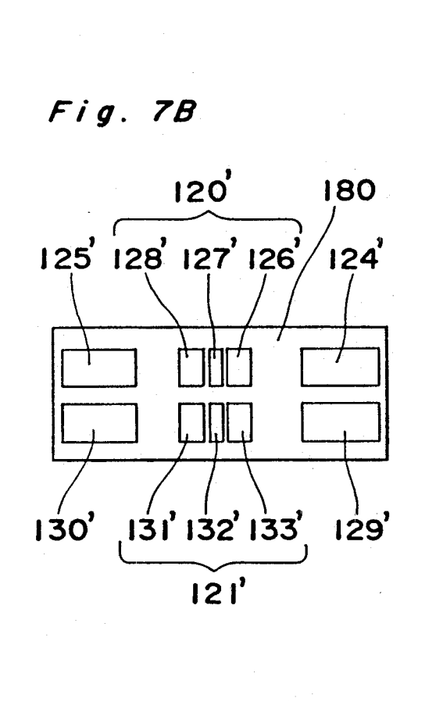
FIG. 7B is a top plan view showing, on an enlarged scale, arrangement of the photo-detectors on a glass substrate in the modification of the embodiment of FIG. 7A.

It should be noted here that, in the foregoing embodiment, although the focal distances of the focusing grating couplers 107 and 108 are adapted to be equal to each other, and the three-division photo-detector 120 is disposed after the focal point. With the three-division photo-detector 121 being provided before said focal point, the arrangement may be modified as shown in FIG. 7A, so that the focal distances of the focusing grating couplers 107 and 108 are different from each other. An Si substrate 180 holds two sets of three-division photo detectors 120' and 121', and photo-detectors 124' and 125' and 129' and 130' as illustrated in FIG. 7B, in the vicinity of the end face of the glass substrate 101. The three-division photo-detectors 120' and 121', and the photo-detectors 124', 125', 129', and 130' are constituted by a PIN diode array with the same functioning principles thereof as that in the foregoing embodiment. Moreover, the previous embodiment may be modified so that the above Si substrate 180 is spaced from the end face of the glass substrate 101, and each reflected light ray from the glass substrate 101 is adapted to be incident upon the above PIN diode array through a lens means.

The magneto-optical device employed in the above-embodiment may be replaced by other disc devices not utilizing the Kerr effect, e.g., optical disc devices for compact discs, video discs, or additionally-writing type discs, etc.

Furthermore, in the foregoing embodiment, although the semi-conductor laser of a three beam type is employed, it may be so modified that light emitted from one beam semi-conductor laser is divided into diffraction light of zero order and ± first order to be used for the purpose.

Similarly, in the above-embodiment, although the focusing grating couplers 107 and 108 are arranged to selectively guide the TE mode and TM mode by slightly altering the grating cycle to each other, the arrangement may also be so modified that the same grating pattern may be used respectively for the TE mode and TM mode by slightly changing the layer thickness of the optical waveguide layers 102 and 103.

Meanwhile, the focusing grating coupler described as employed in the foregoing embodiment may be replaced by a grating coupler and a waveguide lens means.

Moreover, either one in each set of the photo-detectors 124 and 125, 129 and 130, 124' and 125', or 129' and 130' may be abbreviated for simplification of the construction.

As is seen from the foregoing description, the optical information processing apparatus according to the first embodiment of the present invention is arranged so that light reflected from the information writing medium is introduced by the light introducing means, into the first and second optical waveguides formed on the opposite sides of the transparent substrate, thereby to detect the reproduction signal, tracking error signal, and focusing error signal by a detecting device based on the reflected light introduced into said optical waveguides, and therefore, making it possible to effect stable focusing functions and tracking functions even when the information writing medium is still inclined, and while the optical head may be made compact in size and yield high performance.

Furthermore, the detecting device includes a three-division photo-detector disposed before the focal point of the reflected light introduced into said first optical waveguide, and another three-division photo-detector provided after the focal point of the reflected light introduced into the second optical waveguide, whereby the differentiation of the light receiving outputs between the central portion and opposite end portions is calculated with respect to each of the above two sets of photo-detectors so as to detect the focusing error signal through comparison of the above two differentiations, thereby making the focusing function still more stable.

Figure 8:
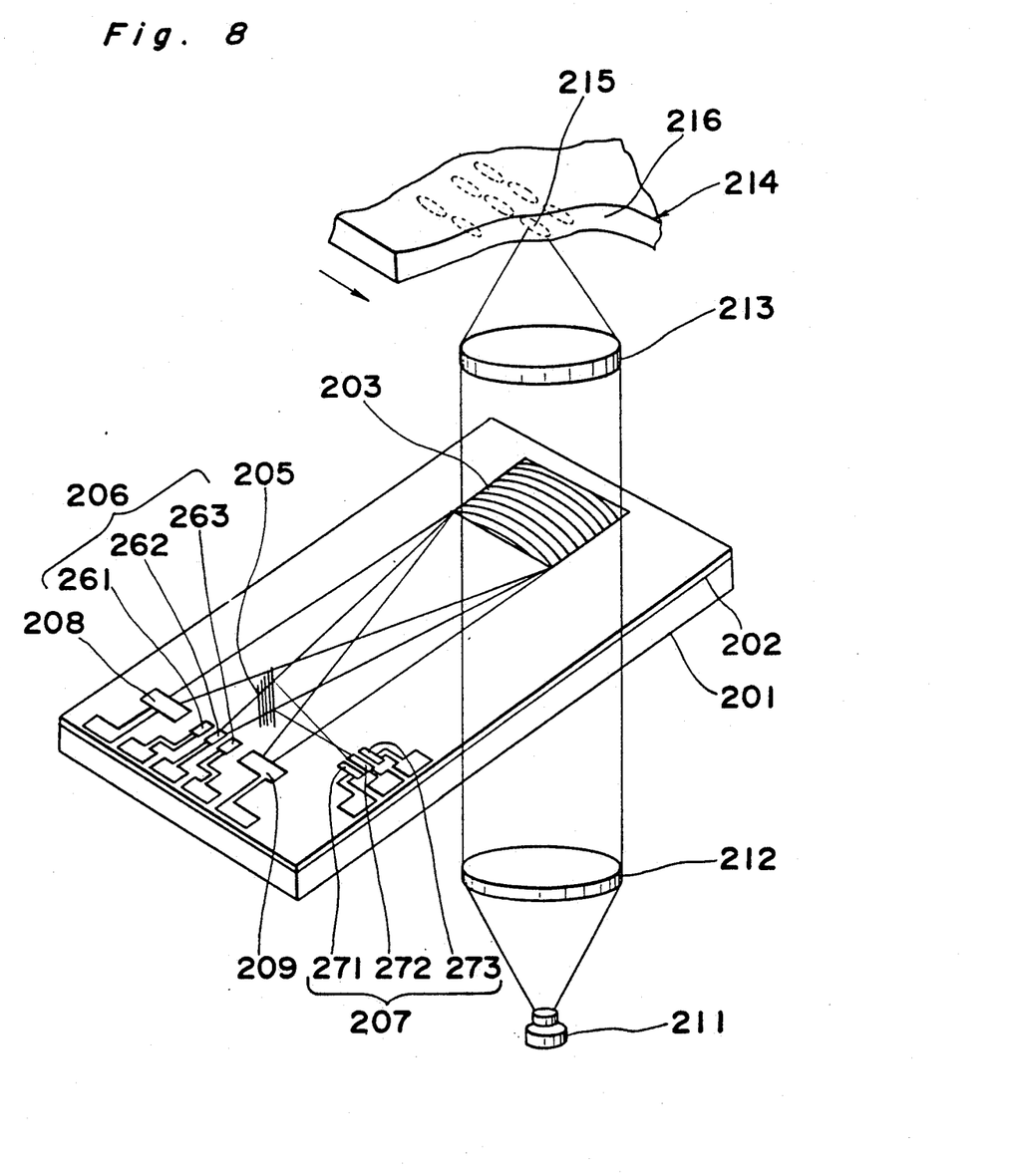
FIG. 8 is a view similar to FIG. 3, which particularly shows a further embodiment thereof.

Reference is further made to FIG. 8 showing an optical information processing device according to a second embodiment of the present invention. In FIG. 8, the processing device includes a transparent substrate 201 of the Pyrex glass having a thickness of 1 mm, a planar plate optical waveguide layer 202 of #7059 glass 0.76 $\mu$m in thickness and formed on the glass substrate 201 by sputtering process, and a silicon nitride clad layer further formed on the optical waveguide layer 202 by plasma CVD process. After further application of a resist layer thereon, a focusing grating coupler 203 and a grating beam splitter 205 are formed through utilization of the electron beam direct drawing method and etching technique. Furthermore, on the glass substrate 201, two sets of three-division photo-detectors 206 and 207 and photo-detectors 208 and 209 are formed through vapor deposition.

Figure 10A:
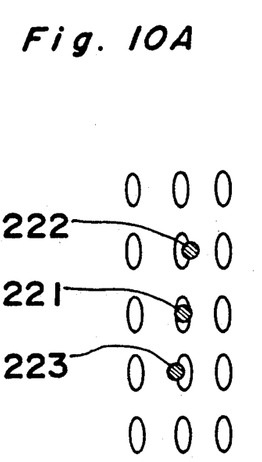
Figure 10B:
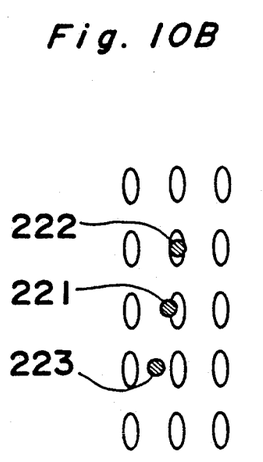
Figure 10C:
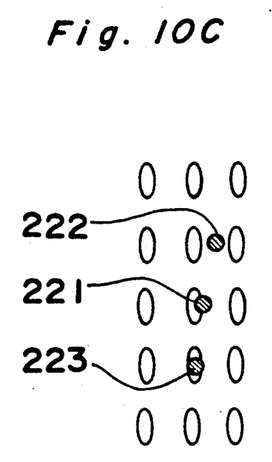

Light in three beams with a spot interval of 100 μm emitted from a semi-conductor laser 211 disposed below the substrate 201 is formed into parallel light by a collimating lens 212 provided above said semi-conductor laser so as to be incident upon the focusing grating coupler 203. Subsequently, the zero-order diffraction light transmitted through the focusing grating coupler 203 forms a main spot 221 and sub-spots 222 and 223 on the optical disc 214 by a condenser lens 213 in the state as illustrated in FIGS. 10A, 10B and 10C.

Figure 9:
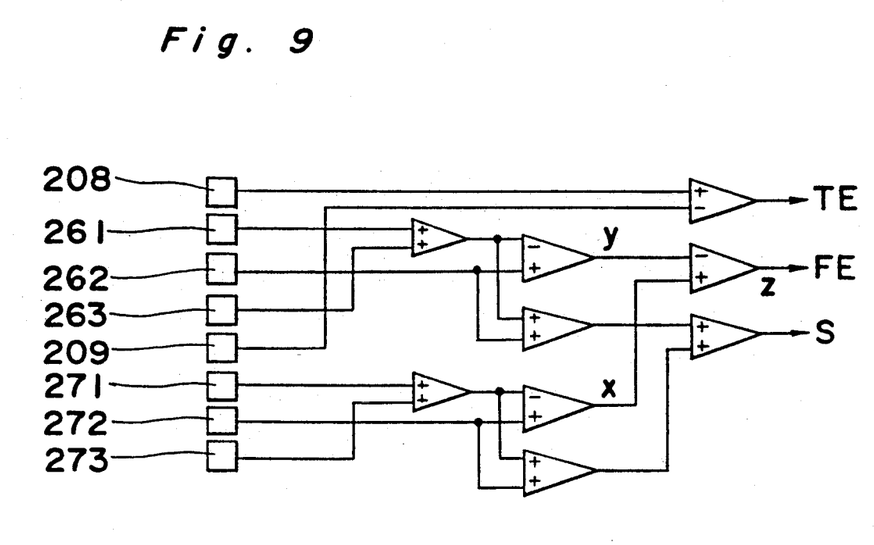
FIG. 9 is an electrical block diagram of a signal detection circuit employed in the arrangement of FIG. 8, FIGS. 10A, 10B and 10C are diagrams for explaining arrangement of light spots on an optical disc.
Figure 11A:
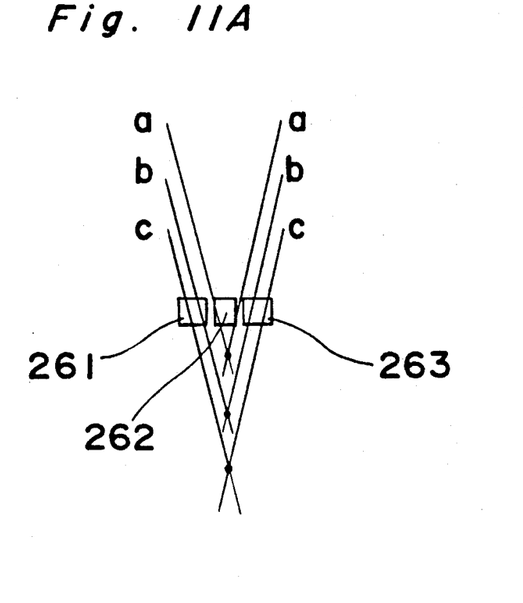
FIGS. 11A and 11B are diagrams showing state of incidence of reflected light into three-division photo-detector in the arrangement of FIG. 8.
Figure 11B:
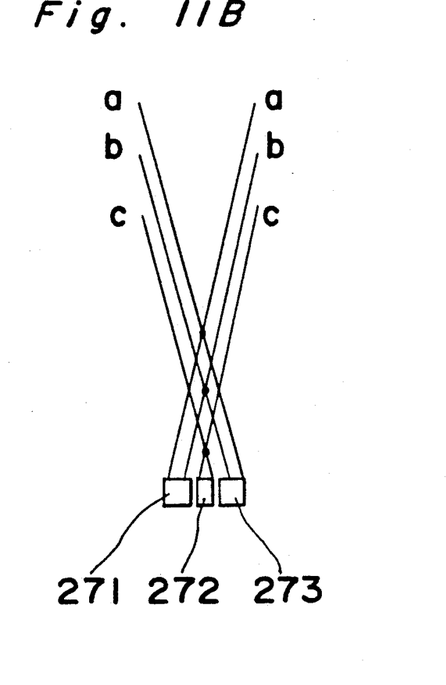
Figure 12:
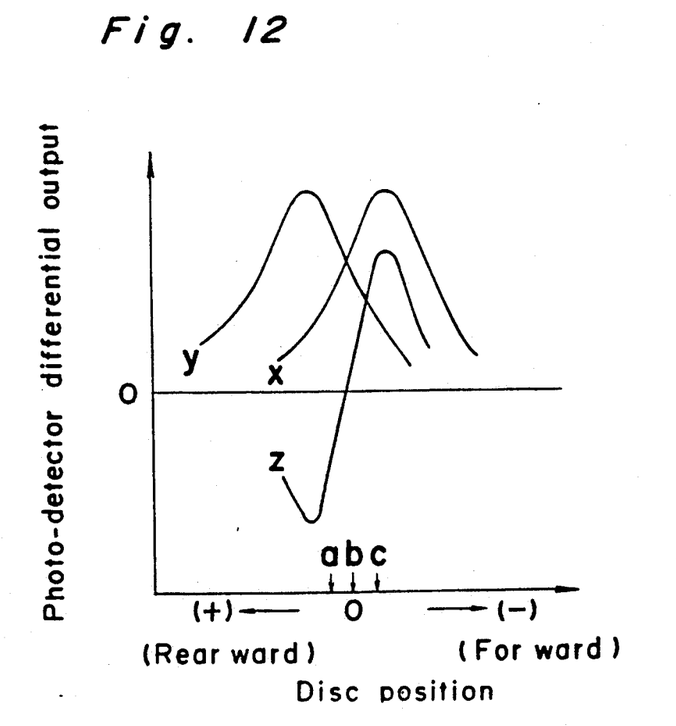
FIG. 12 is a graphical diagram for explaining differential output of the three division photo-detector in the arrangement of FIG. 8.

The reflected light rays of the above respective spots pass through the condenser lens 213 in the reverse direction so as to be the guide light of the optical waveguide layer 202 by the focusing grating coupler 203, and advance towards the photo-detectors 208, 209 and 262 as the focusing light. The reflected light from the main spot 221, i.e., the light ray advancing to the photo-detector 262 is incident upon the three-division photo-detectors 261, 262 and 263 disposed before the focusing point. Meanwhile, half of the light ray changed in its optical path by the grating beam splitter 205 formed in the light path of the ray directed to the photo-detector 262, is incident upon the three-division photo-detectors 271, and 273 disposed after the focusing point thereof.

Where the optical disc 214 is present at the focal point of the main spot 221, the reflected light rays from the optical disc 214 are incident upon the three-division photo-detectors 261, 262, and 263, and 271, 272 and 273 as shown by lines b in FIGS. 11A and 11B. Meanwhile, when the optical disc 214 is located behind the focal point of the main spot 221, the reflected light rays are incident as shown by lines a in FIGS. 11A and 11B, while when the optical disc 214 is located before the focal point of the main spot 221, the reflected light rays are incident as shown by lines C in FIGS. 11A and 11B. Accordingly, the differential outputs between the central portions 262 and 272, and opposite side portions 261, 263, 271 and 273 of the three-division photo-detectors 206 and 207 as shown by x and y in a block diagram of the signal detection circuit in FIG. 9 are respectively represented by curves as shown in FIG. 12 with respect to the disc position. The focusing error signal FE which is the differential output of x and y referred to above is represented by the S-shaped curve as shown by z in FIG. 12, thus making it possible to detect the focal point position.

Subsequently, the tracking error signal is detected as follows.

The pit 215 (FIG. 8) formed on the disc 214 is different in thickness from the substrate 216 by λ/4 (where λ: wavelength). Therefore, in the case where the main spot 221 is located at the center of the track as shown in FIG. 10A, the reflected light rays from the two sub-spots 222 and 223 are of the same intensity, but when the main spot 221 deviates from the center of the track as in FIGS. 10B and 10C, the two sub-spots 222 and 223 become asymmetrical with respect to the center of the track for different reflection light density. Accordingly, by taking the differentiation of the photo-detectors 208 and 209 as shown in FIG. 9, the tracking error signal TE may be detected.

It is to be noted here that the recording signal S is selected as shown in FIG. 9 by receiving the reflected light from the main spot 221.

As described above, since the incident light from the semi-conductor laser 211 is arranged to be projected onto the optical disc 214 without being introduced into the optical waveguide layer 202, efficiency for utilizing the semi-conductor laser light may be improved.

Moreover, owing to the arrangement that the reflected light from the optical disc 214 is introduced into the optical waveguide layer 202 by the grating coupler 203, and the differentiation of the light receiving output between the central portion and the opposite side portions is calculated with respect to each of the three-division photo-detector 206 disposed before the focal point of the reflected light, and the three-division photo-detector 207 disposed behind the focal point of the light ray altered in its light path by the grating beam splitter 205 formed in the course of the reflected light, thereby to detect the focusing error signal through comparison of the above two differentiations, there is no possibility to produce offset with respect to the inclination of the optical disc 214, and thus, stable focusing function may be effected.

Furthermore, since it is so arranged that the main spot 221 and sub-spots 222 and 223 are formed on the optical disc 214, and the reflected light rays therefrom are introduced into the optical waveguide layer 202 for subsequent reception by the photo-detectors 208 and 209 to obtain the differentiation of light receiving outputs of said photo-detectors 208 and 209, thereby to detect the tracking error signal, no offset is produced with respect to the inclination of the optical disc 214. Therefore, stable tracking function can also be effected.

It should be noted here that, in the foregoing embodiment, although the three beam semi-conductor laser is employed, this may be replaced by a one beam semi-conductor laser whose emitted light ray is divided into diffraction light of zero order and ± first order through a diffraction grating.

As is clear from the above description, the optical information processing apparatus according to the second embodiment of the present invention includes the optical waveguide formed on the substrate, the light introducing device for introducing light reflected from the recording medium into said optical waveguide to form two collected light rays, a three-division photo-detector disposed before the focusing point of the reflected light introduced into said optical waveguide and a second three-division photo-detector disposed after the focal point, whereby in each of said two sets of three-division photo-detectors, differentiation between light receiving output at its central portion and a sum of light receiving outputs at its opposite sides is calculated so as to detect a focusing error signal through comparison of the differentiations in said two sets of three-division photo-detectors, and therefore, stable focusing function may be effected without forming undesirable offset phenomenon.

Furthermore, since the optical information processing apparatus according to the modification of the second embodiment includes the optical waveguide formed on the substrate means for irradiating a plurality of laser light spots onto the recording medium so as to introduce the reflected light into the optical waveguide, and the set of photo-detectors for subjecting to photoelectric conversion, the reflected light introduced into said optical waveguide for each reflected light corresponding to each spot of the plurality of the laser light spots, so as to correspond to the light intensity thereof, whereby detection of tracking error signal is effected through comparison of light receiving outputs of the photo-detectors, stable tracking function may also be achieved without giving rise to offset phenomenon.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

We claim:

1. An optical information processing apparatus for recording to and reproducing information from an optical recording medium having a plurality of substantially aligned and radially extending tracks by disposing an information bearing light on said tracks, the apparatus comprising:

a substrate, an optical waveguide formed on said substrate, light division means for dividing light reflected by said recording medium through said optical waveguide into first and second converging light beams, a first three-division photo-detector disposed before a focal point of said first converging light beam from said light division means for receiving said first converging light and producing a signal in response thereto, and a second three-division photo-detector disposed after the focal point of said second converging light beam for receiving said second converging light beam and producing a signal in response thereto, and differentiation means for receiving the signals produced by said first and second three-division photo-detectors and for producing a focusing error through comparison of the differentiation between said first and second three-division photo-detectors.

* * * * *